(12) United States Patent
Li et al.

(10) Patent No.: US 9,767,570 B2
(45) Date of Patent: Sep. 19, 2017

(54) SYSTEMS AND METHODS FOR COMPUTER VISION BACKGROUND ESTIMATION USING FOREGROUND-AWARE STATISTICAL MODELS

(71) Applicant: Conduent Business Services, LLC, Dallas, TX (US)

(72) Inventors: Qun Li, Webster, NY (US); Edgar A Bernal, Webster, NY (US); Robert P Loce, Webster, NY (US)

(73) Assignee: Conduent Business Services LLC, Dallas, TX (US)

( * ) Notice: Subject to any disclaimer, the term of this patent is extended or adjusted under 35 U.S.C. 154(b) by 0 days.

(21) Appl. No.: 14/262,360

(22) Filed: Apr. 25, 2014

(65) Prior Publication Data

US 2015/0310297 A1 Oct. 29, 2015

(51) Int. Cl.
| | |
|---|---|
| *G06T 7/194* | (2017.01) |
| *G06K 9/46* | (2006.01) |
| *G06T 7/174* | (2017.01) |
| *G06T 7/11* | (2017.01) |
| *G06K 9/34* | (2006.01) |
| *G06K 9/00* | (2006.01) |

(52) U.S. Cl.
CPC .......... *G06T 7/194* (2017.01); *G06K 9/00785* (2013.01); *G06K 9/342* (2013.01); *G06K 9/4652* (2013.01); *G06T 7/11* (2017.01); *G06T 7/174* (2017.01); *G06T 2207/10016* (2013.01); *G06T 2207/20112* (2013.01); *G06T 2207/30232* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 6,999,620 B1* | 2/2006 | Harville | 382/173 |
| 8,331,695 B1* | 12/2012 | Delva | 382/218 |
| 2003/0044045 A1* | 3/2003 | Schoepflin | G06T 7/0083 382/103 |
| 2006/0285747 A1* | 12/2006 | Blake et al. | 382/180 |
| 2009/0067716 A1* | 3/2009 | Brown et al. | 382/173 |
| 2013/0236098 A1* | 9/2013 | Fujisaki et al. | 382/171 |

(Continued)

OTHER PUBLICATIONS

Li, Liyuan, et al. "Foreground object detection from videos containing complex background." Proceedings of the eleventh ACM international conference on Multimedia. ACM, 2003.*

(Continued)

*Primary Examiner* — Kim Vu
*Assistant Examiner* — Nathan Bloom
(74) *Attorney, Agent, or Firm* — Fay Sharpe LLP

(57) ABSTRACT

Systems and methods are disclosed for background modeling in a computer vision system for enabling foreground object detection. A video acquisition model receives video data from a sequence of frames. A fit test module identifies a foreground object from the video data and defines a foreground mask representative of the identified foreground object. A foreground-aware background estimation module defines a first background model from the video data and then further defines an updated background model from an association of a current frame of the video data, the first background model and the foreground mask.

20 Claims, 5 Drawing Sheets

(56) References Cited

U.S. PATENT DOCUMENTS

| | | | |
|---|---|---|---|
| 2014/0055610 A1* | 2/2014 | Ko et al. | 348/143 |
| 2014/0056472 A1* | 2/2014 | Gu | 382/103 |

OTHER PUBLICATIONS

T. Bouwmans; F. El Baf; B. Vachon (Nov. 2008). "Background Modeling using Mixture of Gaussians for Foreground Detection—A Survey". Recent Patents on Computer Science. 1: 219-237.*

Yannick Benezeth, Pierre-Marc Jodoin, Bruno Emile, Hélène Laurent, Christophe Rosenberger. Comparative study of background subtraction algorithms. Journal of Electronic Imaging, Society of Photo-optical Instrumentation Engineers, 2010, 19.*

Yu, Ting, et al. "Monocular video foreground/background segmentation by tracking spatial-color gaussian mixture models." Motion and Video Computing, 2007. WMVC'07. IEEE Workshop on. IEEE, 2007.*

Babaee, Mohammadreza, Duc Tung Dinh, and Gerhard Rigoll. "A Deep Convolutional Neural Network for Background Subtraction." arXiv preprint arXiv:1702.01731 (2017).*

Elgammal, A., Hardwood, D., Davis, L.: "Non-Parametric Model for Background Subtraction", Computer Vision Laboratory, Univ. Maryland, College Park, MD, 20742, Computer Vision—ECCV 2000 Lecture Notes in Computer Science vol. 1843, 2000, pp. 751-767.

Park, D., Kim, J., Kim, J., Cho, S, Chung, S.T.: "Motion Detection in Complex and Dynamic Backgrounds", School of Electronics and Electrical Engineering, Hongik Univ., 72-1 Sangsu-dong, Mapo-gu, Seoul 121-791, KR, Advances in Image and Video Technology, Lecture Notes in Computer Science vol. 4319, 2006, pp. 545-552.

Koller, D., Weber, J., Malik, J.: "Robust Multiple Car Tracking With Occlusion Reasoning", CA Path Program, Institute of Transporation Studies, U. of CA at Berkely, 1994, 27 pp.

McKenna, S.J., Jabri, S., Duric, Z.; Wechsler, H.; Rosenfeld, A.: "Tracking Groups of People, Computer Vision and Image Understanding", vol. 80, Issue 1, Oct. 2000, 15 pp.

Elgammal, A., Duraiswami, R.; Harwood, D; Davis, L.: "Background and Foreground Modeling Using Nonparametric Kernel Density Estimation for Visual Surveillance", Proceedings of the IEEE, vol. 90, Issue 7, Jul. 2002, pp. 1151-1163.

Cucchiara, R., Grana, C., Piccardi, M., Prati, A.: "Detecting Moving Objects, Ghosts, and Shadows in Video Streams", IEEE Transactions on Pattern Analysis and Machine Intelligence, vol. 25, No. 10, Oct. 2003, pp. 1337-1342.

Cucchiara, R.; Grana, C., Piccardi, Prati, A.: "Detecting Objects, Shadows and Ghosts in Video Streams by Exploiting Color and Motion Information", Proceedings of 11th International Conference on Image Analysis and Processing, Sep. 26, 2001, pp. 360-365, 6 pg.

Stauffer, C., Grimson, W.E.L.: "Adaptive Background Mixture Models for Real-Time Tracking", IEEE Computer Society Conference on Computer Vision and Pattern Recognition, vol. 2, Jun. 23, 1999, pp. 246-252, 7 pg.

Zivkovic, Z.: "Improved Adaptive Gaussian Mixture Model for Background Subtraction", Proceedings of the 17th International Conference on Pattern Recognition, vol. 2, Aug. 23, 2004, pp. 28-31, 4 pg.

Prati, A., Mikic, I., Trivedi, M., Cucchiara, R.: "Detecting Moving Shadows: Algorithms and Evaluation", IEEE Transactions on Pattern Analysis and Machine Intelligence, vol. 25, No. 7, Jul. 2003, pp. 918-923.

Smith, K., Gatica-Perez, D., Odobez, J,. Ba, S.: "Evaluating Multi-Object Tracking", IEEE Computer Society Conference on Computer Vision and Pattern Recognition—Workshop on Empirical Evaluation Methods in Computer Vision (EEMCV), Jun. 2005, 8 pg.

Unzueta, L., Nieto, M., Cortes, A., Barandiaran, J., Otaegui, O., Sanchez, P.: "Adaptive Multi-Cue Background Subtraction for Robust Vehicle Counting and Classification", IEEE Transactions on Intelligent Transportation Systems, (vol. 13, Issue: 2), 14 pg, Feb. 2011.

Li,Q., Bernal, E., Burry, A., Paul, P., Loce, R.: "Method and Apparatus for Processing Image of Scene of Interest", U.S. Appl. No. 14/195,036, filed Mar. 3, 2014.

* cited by examiner

SYSTEMS AND METHODS FOR COMPUTER VISION BACKGROUND ESTIMATION USING FOREGROUND-AWARE STATISTICAL MODELS

CROSS REFERENCE TO RELATED PATENTS AND APPLICATIONS

"Method and Apparatus for Processing Image of Scene of Interest," Li, E. Bernal, A. Burry, P. Paul, R. Loce, U.S. patent application Ser. No. 14/195,036, filed on Mar. 3, 2014.

INCORPORATED REFERENCES

The following documents are fully incorporated herein by reference:

Koller et al., Robust Multiple Car Tracking with Occlusion Reasoning, California PATH Program, Institute of Transportation Studies, University of California at Berkeley, 1994, 27 pp.

McKenna et al., Tracking Groups of People, Computer Vision and Image Understanding, Vol. 80, Issue 1, October 2000, pp. 42-56.

Elgammal et al., Background and Foreground Modeling Using Nonparametric Kernel Density Estimation for Visual Surveillance, Proceedings of the IEEE, Vol. 90, Issue 7, July 2002, pp. 1151-1163.

Cucchiara et al., Detecting Moving Objects, Ghosts, and Shadows in video streams," IEEE Transactions on Pattern Analysis and Machine Intelligence, Vol. 25, Issue 10, October 2003, pp 1337-1342.

Cucchiara et al., Detecting Objects, Shadows, and Ghosts in Video Streams by Exploiting Color and Motion Information, Proceedings of 11$^{th}$ International Conference on Image Analysis and Processing, Sep. 26, 2001, pp. 360-365.

Stauffer et al., Adaptive Background Mixture Models for Real-time Tracking, IEEE Computer Society Conference on Computer Vision and Pattern Recognition, Vol. 2, Jun. 23, 1999, pp. 246-252.

Zivkovic, Improved Adaptive Gaussian Mixture Model for Background Subtraction, Proceedings of the 17$^{th}$ International Conference on Pattern Recognition, Vol. 2, Aug. 23, 2004, pp. 28-31.

Prati et al., Detecting Moving Shadows: Algorithms and Evaluation, IEEE Transactions on Pattern Analysis and Machine Intelligence, Vol. 25, No. 7, July 2003, pp. 918-923.

Smith et al., Evaluating Multi-Object Tracking, IEEE Computer Society Conference on Computer Vision and Pattern Recognition—Workshop on Empirical Evaluation Methods in Computer Vision (EEMCV), June 2005, 7 pp.

Unzueta. Et al., "Adaptive Multi-Cue Background Subtraction For Robust Vehicle Counting And Classification," IEEE Transactions On Intelligent Transportation Systems, (Volume: 13, Issue: 2)

TECHNICAL FIELD

The presently disclosed embodiments are directed to computer vision systems and more particularly video-based detection of objects as a core computer vision and video analytics task. More particularly, the present embodiments relate to a system and method for estimating background image content in a foreground detection process performed on a video sequence employing foreground-aware statistical models.

BACKGROUND

A detection of foreground objects and/or moving objects is a common part of a video-based object tracking operations used in computer vision applications, such as surveillance, traffic monitoring, and traffic law enforcement, etc. Example applications can include, inter alia, vehicle speed estimation, automated parking monitoring, vehicle and pedestrian counting, traffic flow estimation, measurements of vehicle and pedestrian queue statistics, and TET (total experience time) measurements in retail spaces, etc.

Two of the most common methods of motion detection and/or foreground detection used in applications that perform analytics on video data include frame-to-frame differencing and background estimation and subtraction ("background subtraction"). The frame differencing approach detects moving objects, typically by requiring tuning to a very narrow range of object speed relative to the frame rate and camera geometry. Such temporal differencing of frames is often used to detect objects in motion, but fails to detect slow-moving (relative to the video frame rate) or stationary objects, and may also fail to detect fast-moving objects (relative to the video frame rate). The background subtraction approach detects foreground objects, which includes moving objects and may include stationary objects that are not part of the static scene or background. Moving objects can trigger foreground detection because typically their appearance differs from the background estimate. Background subtraction is more flexible in terms of adjusting the time scale and dynamically adjusting parameters in the background modeling. Although the term "subtraction" refers to a 'minus' operation in arithmetic, it often refers to the removal of a component of an image in computer vision and video processing applications. As such, the term can refer to operations including pixel-wise subtractions between images and pixel-wise statistical fit tests between pixel values in an image and a set of corresponding statistical models.

While background estimation can be performed in several ways, the subject disclosure focuses on approaches that construct statistical models describing background pixel behavior. According to this approach, a statistical model (e.g., a parametric density model such as a Gaussian Mixture Model, or a non-parametric density model such as a kernel-based estimate) describing the historical behavior of values for each pixel is constructed and updated continuously with each incoming frame at a rate controlled by a predetermined learning rate factor. Foreground detection is performed by determining a measure of fit of each pixel value in the incoming frame relative to its corresponding constructed statistical model: pixels that do not fit their corresponding background model are considered foreground pixels, and vice versa. The main limitation of this approach is that the choice for a learning rate involves a tradeoff between how fast the model is updated and the range of speed of motion that can be supported by the model. Specifically, too slow a learning rate would mean that the background estimate cannot adapt quickly enough to fast changes in the appearance of the scene (e.g., changes in lighting, weather, etc.); conversely, too fast a learning rate would cause objects that stay stationary for long periods (relative to frame rate and learning rate) to be absorbed into the background estimate.

Statistical modeling of historical behavior of pixel values is often used as a method for background estimation that is more robust than other adaptive methods such as temporal frame averaging, which, while less computationally intensive, are incapable of supporting wide ranges of speeds of motion, or accurately describing background images when the distribution of its pixel values is not unimodal.

Thus a main weakness of traditional model-based background estimation algorithms is that the learning parameter a has to be carefully selected for the expected range of object velocity in the scene relative to the frame rate. As noted above, too slow a learning rate would mean that the background estimate cannot adapt quick enough to fast changes in the appearance of the scene, and too fast a learning rate would cause objects that stay stationary for long periods (relative to the frame rate and the learning rate) to be absorbed into the background estimate.

With reference to FIG. 1, a traditional process for background estimation and updating, and foreground detection is illustrated. This prior art system 10 utilizes video data from a plurality of frames including a set of precedent frames 12 ($F_{t-1}$ - $F_{t-4}$) to establish a background model $BG_t$ of 14. A current frame $F_t$ 16 is provided to the fit test module 18 along with a background model 14 to generate the current foreground mask $FG_t$ 20. The background model $BG_t$, along with frame $F_t$ are input to the model update module 24, i.e., $BG_{t+1}$ 22, is generated by background model update module 24 with only inputs from the current background model 14 and the current frame 16. It is noteworthy that the current foreground mask 20 is not employed by the background update module 24 to generate the next subsequent background model 22. The background models 14, 22 are sets of pixel-wise statistical models, the foreground mask is a binary image representation, and the frames 12, 16 are grayscale/color images.

There is thus a need for improved methods and systems for background estimation from video image data which quickly responds to variations in the background such as environment changes or lighting changes, while avoiding the problem of absorbing foreground objects into the background estimation model. More particularly, such systems and methods would compose a background model of a different statistical model for each pixel wherein each pixel-based statistical model is updated only when that particular pixel does not contain a foreground object.

The terms "background image" or "estimated background" refer to an image having the same pixel dimensions as the current frame. The background image contains a current estimate of a background in the form of pixel-wise statistical models of the historical values of every pixel (e.g., a mixture of Gaussians). These statistical models are maintained throughout the duration of the foreground detection task and updated with every incoming frame. In order to convert this pixel-wise model set to an image representation, single values representative of the distribution can be selected. For example, each pixel value in the background frame may be assigned a value equal to the weighted sum of means of the individual Gaussian components. In another embodiment, the mode, the median, or more generally, a statistic representative of the distribution can be used.

The terms "foreground image" and/or "foreground mask" refer to a classification mask, such as, for example, a binary mask, with pixel values equal to one (1) at coordinates corresponding to a location of a detected foreground pixel. It should be noted that alternative labeling and/or representations of the foreground mask can be used, as long as pixel values corresponding to the detected foreground object have a label that distinguishes it from the background.

SUMMARY

Embodiments of systems and methods are disclosed for statistical modeling of background estimates that result in improved foreground object detection performance while being less sensitive to the choice of learning rate, thus enabling support for an extended range of speeds of motion, and at the same time being able to quickly adapt to fast changes in the appearance of the scene. The embodiments comprise the following: (1) a video acquisition module which provides the incoming video frames either via real-time acquisition with a camera or by reading videos stored offline; (2) a fit test module which outputs a foreground estimate by performing pixel-wise goodness of fit tests of the pixel values in each incoming frame received from the video acquisition module relative to the background model; and (3) a foreground-aware background model update module which stores the current background model and updates it according to the foreground detected by the fit test module and the incoming frame received from the video acquisition module.

Alternatively, an embodiment is disclosed comprising a system for background modeling in a computer vision system for enabling foreground object detection including a video acquisition module for receiving video data from a sequence of frames acquired from an associated image capture device monitoring a scene of interest; a fit test module for identifying the pixels associated with the foreground object from the video data and for defining a foreground mask representative of the identified foreground object; and a foreground-aware background estimation module for defining a parametric first background model from the video data, wherein the foreground-aware background estimation module further defines an updated background module from an association of a current frame from the sequence of frames, the first background model and the foreground mask. The first and updated background models comprise a statistical estimation model representative of pixel values for pixels in a selected frame from the sequence of frames including a Gaussian mixture comprising a sum of weighted Gaussian components. A foreground-aware background estimation module includes a processor for updating the weights and the parameters of each Gaussian component in accordance with incoming pixel values of the current frame for pixels excluded by the foreground mask whereby only pixel values of the updated background model are updated for the current frame.

DETAILED DESCRIPTION

Figure 1:
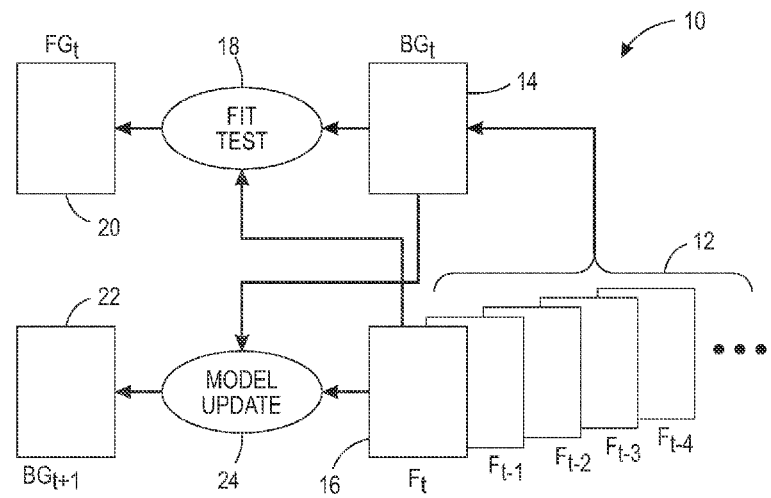
FIG. 1 is a block diagram/flowchart of a prior art background estimation/updating and foreground detection algorithm.

The following terminology and notation will be used throughout describing the present embodiment.

BG$_0$: the initial background model (array of pixel-wise statistical models) extracted, e.g., by setting the means of Gaussian components of each pixel to the pixel value and setting the covariance matrix to a diagonal matrix with large positive entries. Alternatively, BG$_0$ can be loaded from a database of previous models from the same scene. A background model is said to have been initialized once the parameters that best describe the statistical models for every pixel are determined. Upon completion of the training phase, BG$_0$ converges to BG$_1$;

F$_i$: the i-th video frame (grayscale or color), where i represents a temporal index;

BG$_i$: the i-th background model (array of pixel-wise statistical models) used for foreground detection in conjunction with frame F$_i$; this is the model available before an update occurs based on the newly incoming pixel samples in F$_i$;

FG$_i$: the i-th foreground binary mask obtained via comparison between BG$_i$ and F$_i$;

BG$_{i+1}$: the (i+1)-th background model obtained by updating the pixel-wise background models in BG$_i$ with the pixel values in F$_i$; FG$_{i+1}$ will subsequently be determined via comparison between BG$_{i+i}$ and frame F$_{i+1}$.

Traditional methods of using statistical model for background estimation include the following steps/operations.

Pixel Modeling

Statistical models for background estimation model the values of a pixel over time as the instantiations of a random variable with a given distribution. Background estimation is achieved by estimating the parameters of the distributions that accurately describe the historical behavior of pixel values for every pixel in the scene. Specifically, at frame n, what is known about a particular pixel located at coordinates (i,j) is the history of its values $$\{X_1, X_2, \ldots, X_n\} = \{I(i,j,m), 1 \le m \le n\} \quad (1)$$

where X$_n$ is the pixel value at frame n, I is the image sequence or video frame sequence, (i,j) are the pixel indices and m is the image frame index.

While the historical behavior can be described with different statistical models including parametric models that assume an underlying distribution and estimate the relevant parameters, and non-parametric models such as kernel-based density estimation approaches, the present embodiments implement the proposed algorithm in terms of Gaussian mixture models, and note that it is equally applicable to other online modeling approaches. The recent history of behavior of values of each pixel are modeled as a mixture of K Gaussian distributions, so that the probability density function for the current value is $$P(X_t) = \sum_{i=1}^{K} w_{it} \eta(X_t, \mu_{it}, \Sigma_{it}) \quad (2)$$

where w$_{it}$ is an estimate of the relative weight of the i-th Gaussian component in the mixture at time t, μ$_{it}$ is the mean value of the i-th Gaussian component in the mixture at time t, Σ$_{it}$ is the covariance matrix of the i-th Gaussian component in the mixture at time t, and η(·) is the Gaussian probability density function. Reference is made to μ$_{it}$, Σ$_{it}$, and w$_{it}$ as parameters of the Gaussian mixture model. Note that when other statistical models are used, the relevant parameters will differ. Initializing and updating a given statistical model will update the values of the parameters. In the case where color images are used, sometimes a reasonable assumption is for the different color channels to be uncorrelated, in which case Σ$_{it}$=σ$_{it}$I. This is not intended to be a limiting statement, since non-diagonal covariance matrices are used in the more general case.

Pixel modeling is usually conducted during the initialization/training phase of the background model. To this end, the first N frames (usually N~100 in practice) are used to train the background model. A background model is said to have been initialized once the parameters that best describe the mixture of Gaussians (mean vectors and covariance matrices for each Gaussian component) for every pixel are determined. For simplicity, the initialization/training phase of the background model is omitted from the description of the system and it is assumed that the background model has been initialized upon the beginning of the foreground detection process.

Foreground Pixel Detection

Foreground detection is performed by determining a measure of fit of each pixel value in the incoming frame relative to its constructed statistical model. In one embodiment, as a new frame comes in, every pixel value in the frame is checked against its respective mixture model so that a pixel is deemed to be a background pixel if it is located within T=3 standard deviations of the mean of any of the K components. Use of other values for T or membership/fit tests to determine pixel membership (e.g., maximum likelihood) is possible.

Model Updating

If none of the K distributions match the current pixel value according to the membership test described above, the least probable distribution in the mixture is replaced with a distribution with mean equal to the incoming pixel value, some arbitrarily high variance, and a small weighting factor, the two latter statements reflecting the lack of confidence in the newly added component.

The weights of the distributions are adjusted according to:

$$w_{i(t+1)} = (1-\alpha) w_{it} + \alpha M_{it} \quad (3)$$

where α is the learning or update rate and M$_{it}$ is an indicator variable equaling 0 for every component except the matching one (in which case M$_{it}$=1), so that only the weight factor for the matching distribution is updated. Similarly, only the mean and standard deviation/covariance estimates for matching distributions are updated according to:

$$\mu_{t+1} = (1-\rho)\mu_t + \rho X_t \quad (4)$$

$$\sigma_{t+1}^2 = (1-\rho)\sigma_t^2 + \rho(X_t - \mu_{t+1})^T(X_t - \mu_{t+1}) \quad (5)$$

where X$_t$ is the value of the incoming pixel and ρ=αη(X$_t$|μ$_k$, σ$_k^2$) is the learning rate for the parameters of the matching component of the distribution, k.

Figure 3:
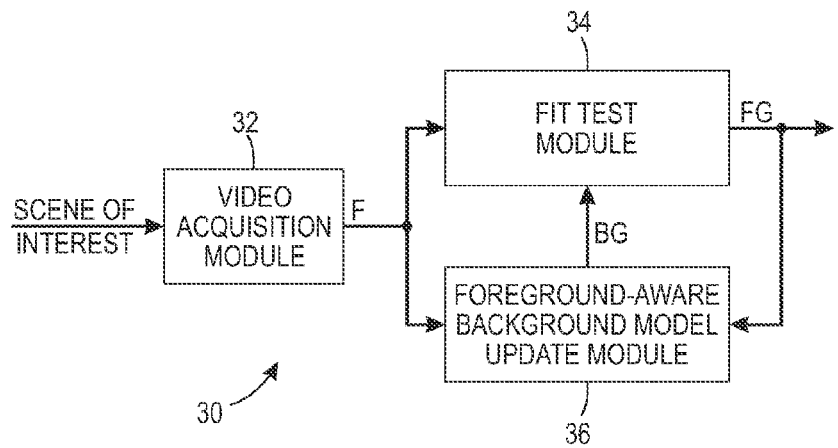
FIG. 3 is a block diagram schematic of a subject embodiment.
Figure 5A:
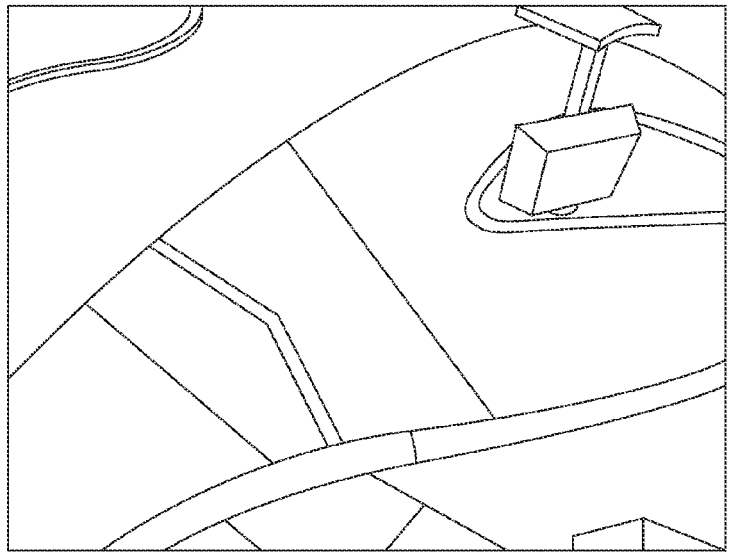
FIG. 5(a) is a sample background image.
Figure 5B:
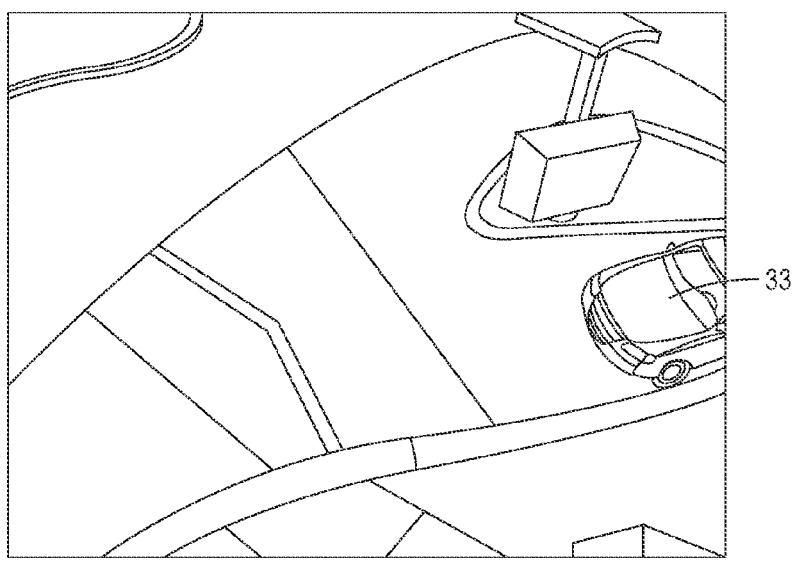
FIG. 5(b) is a representative of a sample frame showing the incoming foregoing object.

With particular reference to FIG. 3, the principal system elements are illustrated. In this system embodiment 30, a Video Acquisition Module 32 includes a surveillance camera acquiring video of the region of interest. For illustration purposes, in an example embodiment, a camera with a 1280×720 pixel resolution and 30 fps frame rate capabilities can be typically used. Alternatively, stored video can be read from its storage medium. Note that not all motion/foreground detection requires such high resolution; therefore the video frame is usually resized to a lower resolution before processing. Besides computational efficiency, another benefit that comes with resizing is that the pixel-level model would be less sensitive to camera motion due to the use of low-pass filtered version of the image. FIGS. 5(a) and 5(b) illustrate representative sample frames captured with the camera used in explaining the embodiments. FIG. 5(a) is the background image of the region of interest. FIG. 5(b) shows a foreground object 33, e.g., a car, moving into the scene. In order to achieve a graphical representation of the estimated background model, the mode of the distribution at each pixel is chosen as the displayed background pixel value. For simplicity, the initialization/training phase of the background model is omitted from the description of the system and it is assumed that the background model $BG_1$ has been initialized upon the beginning of the foreground detection process. Video Acquisition Module 32 provides video frames $F_1 \ldots F_t$ that are input to the Fit Test Module 34 and the Foreground-Aware Background Model Update Module 36. The frames F are input to both modules 34, 36, but the foreground mask FG is also input to the Foreground-Aware Background Model Update Module 36.

Figure 2:
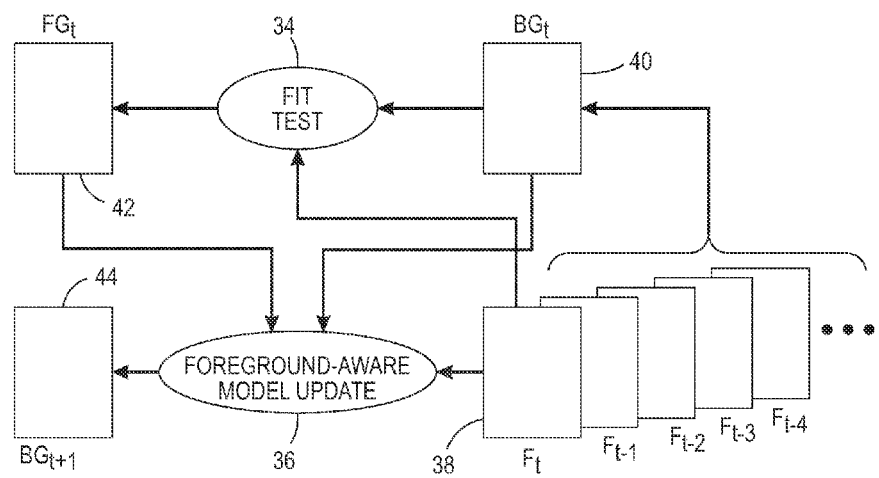
FIG. 2 is a block diagram/flowchart of a background estimation/updating and foreground detection algorithm in accordance with the subject embodiments.
Figure 5C:
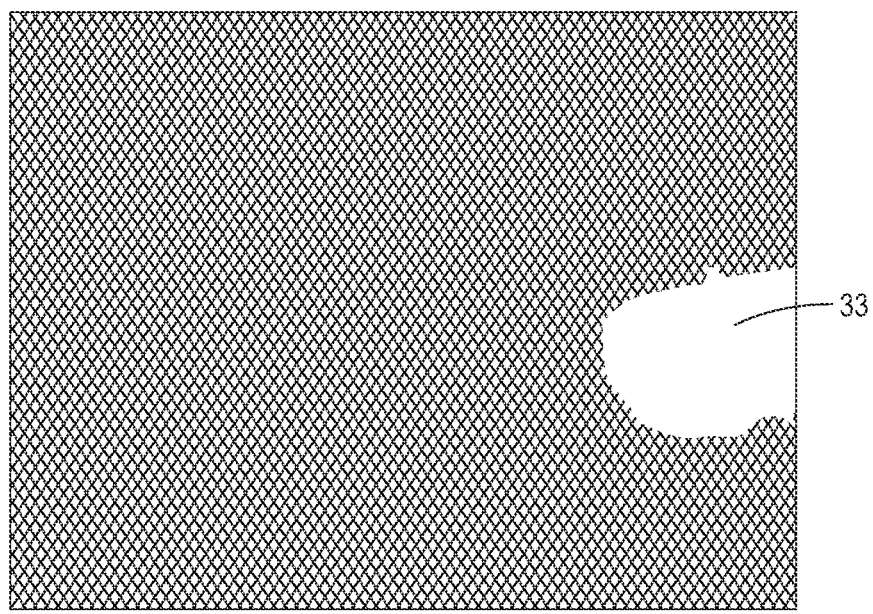
FIG. 5(c) is an estimated foreground mask corresponding to the sample frame of FIG. 5(b).

The Fit Test Module 34 outputs a foreground estimate by performing pixel-wise goodness of fit tests of the values in each incoming frame received from the video acquisition module 32 relative to the background model maintained by the foreground-aware model update module. This module 34 implements the Fit Test operation that takes the current background model $BG_t$ and the most recent video frame $F_t$, and outputs the current foreground mask $FG_t$. More particularly, and with additional reference to FIG. 2, at time index t, the Fit Test Module 34 takes an incoming frame $F_t$ 38 from the Video Acquisition Module 32, and the current background estimate $BG_t$ 40 from the Foreground-Aware Background Estimation Module 36 and, for each pixel in the incoming frame, determines whether it belongs to the foreground or to the background according to its RGB value (grayscale value in the case of grayscale processing) and to its corresponding mixture model. In one implementation of the embodied algorithm, a pixel is deemed to belong to the background if its color value is within three standard deviations of any component in its corresponding Gaussian mixture. Otherwise, it is considered to be a foreground pixel. As such, this module outputs a binary mask $FG_t$ 42 with the same pixel dimensions as the incoming frame, with ON (OFF) values at foreground (background) pixel locations. In order to remove the effect of noise and spurious sources of motion, as well as to fill any holes that occur in foreground objects, this module 34 can additionally implement morphological operations such as erosions, dilations, hole filling and convex hull determination. FIGS. 5(a)-5(c) illustrate the operational effect of the fit test module 34. In order to achieve a graphical representation of the estimated background model, the mode of the distribution at each pixel is chosen as the displayed background pixel value. FIG. 5(c) illustrates the binary foreground mask corresponding to the video data of FIG. 5(b).

The Foreground-Aware Background Model Update Module 36 stores the current background model $BG_t$ and updates it according to the foreground mask $FG_t$ output by the Fit Test Module 34, and the incoming frame $F_t$ 38 received from the video acquisition module. The result is an updated background model $BG_{t+1}$ 44 to be stored and used in the processing of the next and new incoming frame $F_{t+1}$.

For each pixel, the weights of the distributions are adjusted according to:

$$w_{i(t+1)} = fg_t w_{it} + (1-fg_t)((1-\alpha)w_{it} + \alpha M_{it}) \quad (6)$$

where $\alpha$ is the learning or update rate, and $M_{it}$ is an indicator variable equaling 0 for every component except the matching one (in which case $M_{it}=1$), so that only the weight factor for the matching distribution is updated; lastly, $fg_t$ is the binary value of the foreground mask $FG_t$ at the pixel whose model is being updated.

Similarly, only the mean and standard deviation/covariance estimates for matching distributions are updated according to:

$$\mu_{t+1} = fg_t \mu_t + (1-fg_t)((1-\rho)\mu_t + \rho X_t) \quad (7)$$

$$\sigma_{t+1}^2 = fg_t \sigma_t^2 + (1-fg_t)((1-\rho)\sigma_t^2 + \rho(X_t-\mu_{t+1})^T(X_t-\mu_{t+1})) \quad (8)$$

where $X_t$ is the value of the incoming pixel, and $\rho = \alpha \eta (X_t|\mu_k,\sigma_k^2)$ is the learning rate for the parameters of the matching component of the distribution, k. In other words, the weights and the parameters of each Gaussian component are updated in accordance with incoming pixels of the current frame for pixels outside of the foreground mask, thereby precluding absorbing the foreground object into the updated background estimation model.

Figure 4:
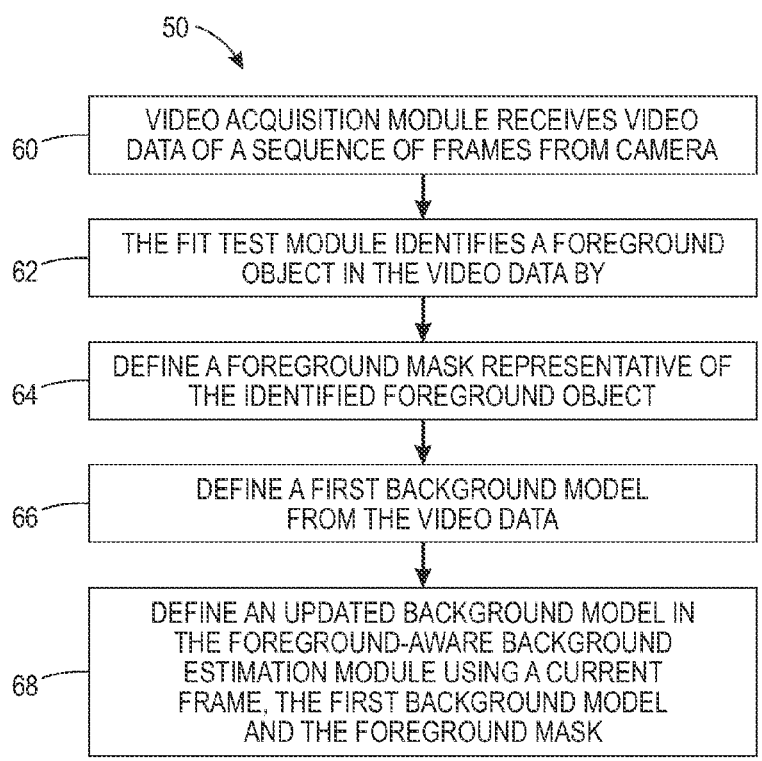
FIG. 4 is an overview of a method for practicing the subject embodiments.

With particular reference to FIG. 4, flowchart 50 summarily illustrates the foregoing processing steps. The Video Acquisition Module 32 receives video data 60 from a sequence of frames from an associated image capture device like a camera. A foreground object, e.g., automobile, is identified in the video data by the Fit Test Module 34 of the foreground mask 42 and is then defined at 64 as representative of the identified foreground object. A first background model is defined 66 from the video data in the Foreground-Aware Background Estimation Module 36. Thereafter, an updated background model 44 is defined 68 in the Foreground-Aware Estimation Module 36 using a current frame 38, the first background model 40 and the foreground mask 42. The foreground mask 42 thus allows the Foreground-Aware Background Estimation Module 36 to only update the corresponding pixel values of the current frame for pixels that are excluded by the foreground mask, whereby only the pixel values of the updated background model are updated for the current frame, thereby precluding absorbing the foreground object into the updated background estimation model. The foregoing embodiment is thus an implementation where the pixel values in the foreground mask are used to make a hard decision as to whether a given model is to be updated or not.

The effect of performing the updates in the manner described is that only models for background pixels get updated at each frame, which eliminates the risk for a foreground object being absorbed into the background, thus inaccurately affecting the background model for that pixel.

Figure 6:
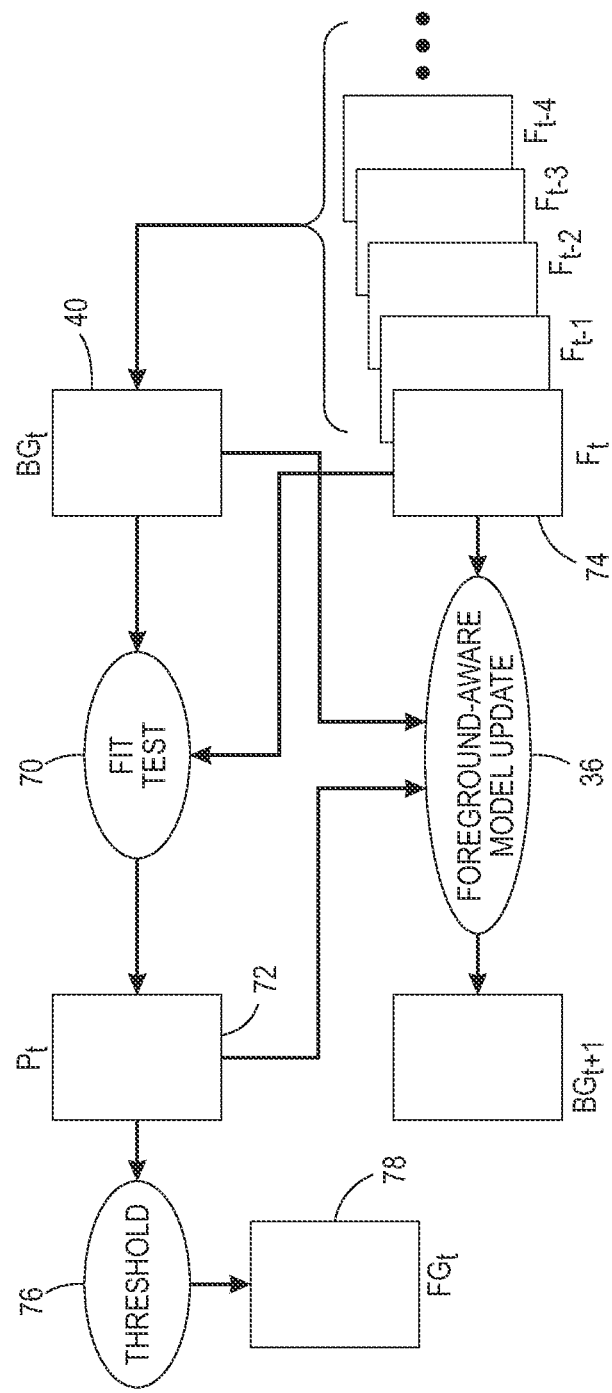
FIG. 6 is a block diagram/flowchart of an alternative embodiment for background estimation/updating and foreground detection in accordance with the present embodiments.

With particular reference to FIG. 6, an embodiment of an alternative algorithm for background estimation/updating foreground detection is illustrated. The Fit Test Module 70 can actually output probabilities of a pixel belonging to its respective background distribution. Probability matrix $p_t$ 72 indicates the probability that each pixel value in frame $F_t$ 74 belongs to its respective distribution; a thresholding operation in thresholding processing module 76 results in a foreground mask 78 equivalent to that described in the foregoing embodiment of FIG. 2.

When intermediate probabilities are available, the updating rules implemented by the foreground-aware background model update module are as follows:

$$w_{i(t+1)} = (1-p_t)w_{it} + p_t((1-\alpha)w_{it} + \alpha M_{it}) \quad (7)$$

$$\mu_{t+1} = (1-p_t)\mu_t + p_t((1-\rho)\mu_t + \rho X_t) \quad (8)$$

$$\sigma_{t+1}^2 = (1-p_t)\sigma_t^2 + p_t((1-\rho)\sigma_t^2 + \rho(X_t-\mu_{t+1})^T(X_t-\mu_{t+1})) \quad (9)$$

which reflects the estimated confidence of a pixel belonging to its respective background distribution.

The foregoing embodiments will thusly support an increased range of patterns of motion of objects for a given learning rate. They also have the advantage of being less sensitive to the choice of learning rate to achieve a satisfactory detection performance and greatly improve the detection performance with a relatively small learning rate value, which in turn enables responsiveness of the background model to fast changes in the appearance of the scene at a region of interest.

The foregoing described modules such as the Fit Test Module 34 and the Foreground-Aware Model Update Module 36 are intended to embody a computer or processing based device, either hardware or software, and thus comprise non-transitory storage mediums for storing instructions readable and executable by an electronic data processing device. Such a storage medium can also include a cloud-based server complemented by a network of computers operatively interconnected via a network.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for parametric background modeling in a computer vision system for enabling foreground object detection, comprising:
    a video acquisition module for receiving video data from a sequence of frames acquired from an associated image capture device monitoring a scene of interest, wherein the video acquisition module includes an at least one video capture device;
    a fit test module for performing pixel-wise goodness of fit tests for pixel values in the incoming frames received from the video acquisition module, wherein the fit test module identifies the pixels associated with the foreground object from the video data obtained from the at least one video capture device where the identified pixels are determined to belong to the foreground or to the background according to the individual pixel's RGB value and to the individual pixel's corresponding mixture model, the identified pixels defining a foreground mask representative of the identified foreground object; and
    a foreground-aware background estimation module for maintaining a parametric background model wherein the foreground-aware background estimation module includes a processor for updating individual pixel models in accordance with incoming pixel values of the current frame, whereby only the pixels outside of the foreground mask are updated with a new individual pixel model, leaving the models for pixels in the foreground mask unchanged.

2. The system of claim 1 wherein the foreground mask comprises a binary mask.

3. The system of claim 2 wherein the binary foreground mask is generated by thresholding a probability matrix output by the fit test module.

4. The system of claim 2 wherein the binary foreground mask is generated directly by the fit test module.

5. The system of claim 1 wherein the background models comprise a statistical estimation model representative of historical pixel values from the sequence of frames.

6. The system of claim 5 wherein the fit test module includes a processor for comparing pixel values between the background model and corresponding pixel values in the current frame.

7. The system of claim 6 wherein the fit test module computes a probability score representative of a confidence that the pixels in the current frame belong to a corresponding respective distribution.

8. The system of claim 7 wherein the foreground-aware background estimation module includes a processor for updating statistical models for the pixel values in accordance with the probability score returned by the fit test module.

9. The system of claim 6 wherein the background estimation module includes a processor for updating statistical models in accordance with incoming pixel values of the current frame for pixels outside of the foreground mask for precluding absorbing the foreground object into the updated background estimation model.

10. The system of claim 6 further including a probability matrix for estimating relative to a preselected threshold if a selected pixel is included in the foreground mask.

11. The system of claim 1 comprising a non-transitory storage medium storing instructions readable and executable by an electronic data processing device.

12. The system of claim 11 wherein the storage medium includes a cloud-based server complemented by a network of computers operatively interconnected via a network.

13. The system of claim 1 wherein the scene of interest comprises a sequence of frames stored in a storage medium.

14. A method for background estimation in a computer vision system for enhanced foreground object detection, comprising:
    receiving video data in a video acquisition module from a sequence of frames acquired from an associated image capture device monitoring a scene of interest;
    identifying a foreground object in the video data with a pixel-wise goodness of fit test for the frames received from the video acquisition module, wherein the pixel-wise goodness of fit test is made in a fit test module;
    defining a foreground mask representative of the identified foreground object by determining whether identified pixels belong to the foreground or the background according to the individual pixel's RGB value and the individual pixel's corresponding mixture model;
    defining a parametric background model from the video data in a foreground-aware background estimation module; and
    updating the background model in the foreground-aware background estimation module by selectively updating individual pixel models in accordance with incoming pixel values of the current frame, whereby only the pixels outside of the foreground mask are updated with a new individual pixel model, leaving the models for pixels in the foreground mask unchanged.

15. The method of claim 14 wherein defining the parametric background model includes defining a Gaussian mixture model.

16. The method of claim 14 wherein the background estimation module includes a processor for updating the statistical models in accordance with incoming pixel values of the current frame for pixels outside of the foreground mask for precluding absorbing the foreground object into the updated background estimation model.

17. The method of claim 14 further including estimating if a select pixel is included in the foreground mask with a probability matrix relative to a preselected threshold.

18. The method of claim 14 further including defining the updated background model in one of a retail application or traffic monitoring environment.

19. The method of claim 14 wherein the monitoring the scene of interest includes monitoring a sequence of frames stored in a storage medium.

20. The method of claim 14 wherein a pixel is deemed to belong to the background if its RGB value is within three standard deviation of any component in its corresponding Gaussian mixture.

* * * * *